(12) United States Patent
Fernandez

(10) Patent No.: US 7,997,231 B2
(45) Date of Patent: Aug. 16, 2011

(54) COMPOSITION SUITABLE FOR AQUATIC HABITAT REPAIR, REPLACEMENT AND/OR ENHANCEMENT

(76) Inventor: Madelaine Joy Fernandez, Tampa, FL (US)

( * ) Notice: Subject to any disclaimer, the term of this patent is extended or adjusted under 35 U.S.C. 154(b) by 1219 days.

(21) Appl. No.: 10/264,075

(22) Filed: Oct. 3, 2002

(65) Prior Publication Data

US 2004/0065266 A1 Apr. 8, 2004

(51) Int. Cl.
*A01K 61/00* (2006.01)
(52) U.S. Cl. ........................................................ 119/221
(58) Field of Classification Search .................. None
See application file for complete search history.

(56) References Cited

U.S. PATENT DOCUMENTS

| | | | | |
|---|---|---|---|---|
| 4,235,948 | A | * | 11/1980 | Holmes ............................ 428/15 |
| 4,385,088 | A | * | 5/1983 | Baskin ............................. 428/15 |
| 5,391,596 | A | * | 2/1995 | Muto et al. ..................... 523/415 |
| 5,628,949 | A | * | 5/1997 | Bordener ....................... 264/161 |
| 5,639,657 | A | * | 6/1997 | Saiki et al. ..................... 435/410 |
| 5,803,660 | A | * | 9/1998 | Warren et al. .................... 405/25 |
| 5,836,265 | A | * | 11/1998 | Barber et al. ................... 119/221 |
| 6,199,317 | B1 | * | 3/2001 | Saiki et al. ........................ 47/1.4 |
| 6,355,192 | B1 | * | 3/2002 | Roth ................................ 264/42 |
| 6,451,722 | B1 | * | 9/2002 | Kim ............................... 501/155 |

FOREIGN PATENT DOCUMENTS

| | | | | |
|---|---|---|---|---|
| GB | 2372191 | A | * | 8/2002 |
| WO | PCT/GB97/00373 | | * | 8/1997 |

OTHER PUBLICATIONS

Merriam-Webster's Collegiate Dictionary, Tenth Edition, definition of "sand".*

* cited by examiner

*Primary Examiner* — K. Smith

(57) ABSTRACT

The current invention provides an improved material for the repair, replacement, and/or enhancement of aquatic habitats. It is a composition for use as a replacement for concrete or as a coating for concrete in structures such as artificial reefs. The combination of calcium carbonate (preferably Aragonite), a resin (preferably a marine use resin or Dion ISO 6631), and a catalyst results in a composition that is strong, durable, easy to use, and compatible with aquatic life. The current invention can be used to fabricate structures for use as a foundation for the repair and regeneration of damaged coral reefs. The organically enhanced nature of the composition facilitates the attachment and growth of coral and algae and is compatible with other aquatic life. The composition can be fabricated into slab form and used as a surface for coral farming/seeding for eventual transplantation of live coral species. The composition can be used to fabricate artificial reef modules as described in the prior art and to duplicate certain species of hard coral. This product can also be used to build structures that will help protect shorelines from erosion. When cast in a molded process, the composition can be used for the formation of aesthetically pleasing formations (replicas of hard coral species) that are also suitable for use in aquariums. The composition can also be used to fabricate structures to be used in freshwater environments to enhance habitats used by desirable fish species for spawning.

30 Claims, No Drawings

COMPOSITION SUITABLE FOR AQUATIC HABITAT REPAIR, REPLACEMENT AND/OR ENHANCEMENT

FIELD OF THE INVENTION

The present invention relates to the field of aquatic habitats. More specifically, it relates to a composition suitable for aquatic habitat repair, replacement and/or enhancement. This composition can be used in the fabrication of structures for use in marine environments that are conducive to both natural and induced colonization by algae and coral. Similarly, this composition can be used in the fabrication of structures for use in freshwater environments that are conducive to the spawning of desirable fish species.

BACKGROUND OF THE INVENTION

Natural reef systems protect our coastlines from erosion and serve as nurseries and habitat for a wide variety of marine life. Unfortunately human activities in the littoral zones of our oceans have damaged or destroyed a significant percentage of natural reef systems. Consequently, individuals and organizations concerned with coastal management have attempted to restore or replace natural reef systems with artificial reefs using a variety of approaches. Over the years, these approaches have ranged from sinking old ships to dumping materials including automobile bodies, construction and demolition debris, and used tires at desired locations.

Unfortunately, artificial reefs constructed using these methods have a number of potential problems. The limited structural stability of artificial reefs constructed by dumping debris restricts their ability to maintain intended functionality. This limitation has been addressed by a number of inventions which include methods of placing debris as well as structures specifically designed to be used as artificial reefs. However, in addition to being structurally stable, an artificial reef must be composed of materials that are compatible with marine life. A number of the structurally stable artificial reef designs use concrete as a primary material because it is strong and durable, because it can be shaped into a complex forms to provide shelter for marine life such as fish and lobsters, and because rough concrete provides algae and coral with ready attachment points lacking in smoother materials such as plastic. However, concrete emits an alkali that is harmful to aquatic life including algae and coral. This invention imports a material from the field of interior design that is compatible with aquatic life while it capitalizes on concrete's structural advantages.

Numerous attempts to solve the problems discussed above are shown in the prior art. U.S. Pat. No. 6,186,702, issued to Bartkowski on Feb. 13, 2001, discloses an artificial reef that is a vertical structure having an enclosed top wall, an opened bottom, and at least three side walls for forming an overall geometric shape. An opening extends through the enclosed top wall and at least one opening extends through each side wall. Although the pyramidal shape provides structural stability, it is fabricated from steel reinforced concrete.

U.S. Pat. No. 5,836,265, issued to Barber, et al. on Nov. 17, 1998, discloses a method for producing artificial reef modules (reef balls) which can be deposited on the ocean floor permitting attachment of coral and other marine growth. The reef balls are produced by placing an inflated bladder within a separable mold of a shape corresponding to a desired external shape of the exterior wall. Small bladders, balls, or forms are positioned between the bladder and the mold for producing holes in the wall of the reef ball. After the bladders or balls are placed between the main bladder and the mold, the mold is filled with cement. The cement is allowed to assume the shape between the main bladder and the mold, setting to form a rigid hollow structure with holes. Individual reef balls are stabilized by locating most of their weight within one foot of the bottom of the reef ball.

U.S. Pat. No. 5,215,406, issued to Hudson on Jun. 1, 1993, discloses an artificial ocean reef module that includes a hollow dome with several ventilation/access openings. The module is constructed by spreading cement on the outer surface of a hemispherical form having an apex and creating an opening in the cement at the apex to serve as a module ventilation port.

U.S. Pat. No. 4,997,311, issued to Van Doren on Mar. 5, 1991 discloses an artificial reef including a thin-walled, plastic hemispherical dome, perforated by several access ports. The circular edge of the dome is turned diametrically outward and back to form a circumferential trough. The domes are transported by ship to the site of deployment and the trough is fitted with engaging hooks and filled with cement. After the cement cures, the hooks are tied to a hoist and the dome is lifted, swung out over the water and dropped. The concrete in the trough pulls the circular edge downward, while the access ports permit water to flow through the dome with some drag. However, the plastic structure does not provide a naturally textured surface to encourage attachment of ocean plant life and corals. The smooth surface also fails to provide a complex habitat for smaller organisms.

U.S. Pat. No. 4,978,247, issued to Lenson on Dec. 18, 1990, discloses a concrete breakwater structure for placing on beaches to prevent erosion. Two essentially triangular end panels are joined by broad, inclined front and rear panels, each having several holes for receiving waves and dissipating their impact. A projecting top panel is also provided for structural integrity and to further dissipate wave action. This structure may be elevated on leg extensions. However, this structure is not designed to function as an artificial reef. Placed on an ocean floor, the directly aligned multiple holes would permit rapid currents to flow through the structure and prevent habitation by certain organisms. The interior of the structure would also be accessible to divers and other predators. Finally, all surfaces are smooth, limiting habitat complexity.

U.S. Pat. No. 4,913,094, issued to Jones on Apr. 3, 1990, reveals an artificial reef in the form of corrugated sheets of polyvinyl chloride (PVC). These sheets are joined together face to face so that the corrugations extend transverse to each other and form enclosed spaces for receiving fish and shell fish. A concrete base acts as an anchor to guide the reef to the ocean floor and to maintain its upright orientation. A problem with Jones is that, whether made of PVC or steel, the sheets are not durable in comparison with concrete structures. This means limited reef life and vulnerability to intruding divers in search of inhabiting fish. Another problem is that the sheets do not provide a natural material and a truly irregular surface conducive to attachment of epifauna and corals.

U.S. Pat. No. 4,508,057, issued to Suzuki on Apr. 2, 1985, discloses an algal culturing reef unit. The unit includes concrete blocks having a porous layer of iron sulfate penetrating inside the concrete. This layer is intended to create acid to neutralize the strong alkali of concrete. Crystal pellets of iron sulfate are pressed into the wet cement during manufacture and dissolve while the blocks cure. A reef design is also provided having a series of parallel planar concrete slabs joined together in a spaced apart relationship. A problem with this structure is that aquatic organisms are left unprotected from natural predators and divers. Another problem is that Suzuki does not present the appearance of a natural reef nor offer the deep irregularities which are attractive to various fish.

U.S. Pat. No. 4,367,978, issued to Schaaf on Jan. 11, 1983, teaches a concrete structure for preventing beach erosion. The structure is a prism-shaped module containing at least one converging passageway for receiving and breaking up waves and slowing the flow rate of the water. It also has oppositely inclined front and rear walls to break waves and serve as an off-shore, reef-like barrier. However, the passageways are open and easily accessible, so that inhabiting organisms have no protection from predation. Another problem is that currents can readily flow through the passageways at a rapid rate, preventing the anchoring of epifauna and the formation of a suitable habitat. Still another problem is that all surfaces are relatively smooth, and thus dissimilar to those of natural reefs.

U.S. Pat. No. 3,898,958, issued to Pranis on Aug. 12, 1975, discloses a fish farming apparatus in the form of a framework of elongate members intended to function as an artificial reef. The members are joined by connector means to form basic units of a matrix, defining a series of open-sided cubes. The members may have a variety of different cross-sectional shapes, and surfaces roughened by sandblasting. Pranis is intended to provide stationary surfaces on which microorganisms can attach themselves and within which large and small fish may live. A problem with Pranis is that it does not resemble a natural reef and does not provide the large surface irregularities which may attract various aquatic organisms. Another problem is that the framework is open so that inhabitants are not protected from natural predators and divers. Still another problem is that the elongate members, whether formed of metal or plastic, are likely to deteriorate in an ocean environment.

Structures similar to Pranis and presenting the same general problems are disclosed in Japanese Patent Number 63-59826 and Japanese Patent Number 2-69124. Other foreign patents teaching various artificial reef and breakwater structures are: Japanese Patent Number 62-220130, Japanese Patent Number 61-96930, and Maheo, French Patent Number 1,174,670, Devin, French Patent Number 79 24207, and Carlet de la Roziere, French Patent Number 698,218, all apparently presenting problems similar to those identified above.

U.S. Pat. No. 5,628,949, issued to Bordener on May 13, 1997, discloses a mold process for producing a finished solid surfaced countertop in which a mold of the product to be produced is placed in a substantially horizontal manner, coated with a high quality resin coating, and filled with a substrate material. A preferred recipe for the substrate material is 75% calcium carbonate (or Gypsum) content and a 25% ortho-resin or other low grade oil based resin material with the addition of a liquid catalyst to initiate the hardening and curing of the substrate material. Although this recipe resembles the composition disclosed in the present application, there is no suggestion that use of a marine resin will result in a composition that is uniquely suited for aquatic applications such as construction of artificial reefs or freshwater habitat enhancement.

It is an object of the present invention to provide a method and composition for fabricating artificial reef structures which are compatible with marine life.

It is another object of the present invention to provide a method, composition, and product which can be used for fabricating reef-like and coral-like structures to be used in the restoration and replication of damaged coral reefs.

It is another object of the present invention to provide a method and composition which can be used for fabrication, through certain specified molding techniques, to authentically replicate certain species of hard corals (Agropora).

It is another object of the present invention to provide a method, composition, and product that provides an enhanced surface area quality for attraction of coral polyps/coral animals.

It is another object of the present invention to provide a method and composition which can be used for fabricating structures to be used in culturing live coral for transplantation.

It is another object of the present invention to provide a method and composition which can be used for fabricating structures to be used for growing algae on a commercial production basis.

It is another object of the present invention to provide a method and composition which can be used for fabricating structures to be used in freshwater environments to enhance habitats used by desirable fish species for spawning.

SUMMARY OF THE INVENTION

The current invention provides an improved material for the repair, replacement, and/or enhancement of aquatic habitats. It is a composition for use as a replacement for concrete or as a coating for concrete in structures such as artificial reefs. The combination of calcium carbonate (preferably Aragonite), a resin, and a catalyst results in a composition that is strong, durable, easy to use, and compatible with aquatic life.

The current invention can be used to fabricate structures for use as a foundation for the repair and regeneration of damaged coral reefs. The nature of the composition facilitates the attachment and growth of coral and algae and is compatible with other aquatic life. The composition can be used to fabricate artificial reef modules as described in the prior art. When cast in a molded process, the composition can be used for the formation of aesthetically pleasing formations (replicated coral species and reef structures) that are suitable to be placed in natural aquatic (saltwater or fresh water) environments. These components may also be used in saltwater or fresh water aquariums. The composition can also be used to fabricate structures to be used in freshwater environments to enhance habitats used by desirable fish species for spawning. The composition can also be used for a base from which coral species can be propagated for eventual transplantation to areas where coral animals and coral reef structures have been damaged or need restoration and/or replacement of coral animals/polyps.

DETAILED DESCRIPTION OF THE INVENTION

The present invention pertains to a composition compatible with aquatic life that can be utilized in diverse ways. The composition is comparable to concrete in strength and durability without the alkali and other toxic elements that leach from concrete and other substances that are presently being used as replacements for natural reef systems in aquatic environments. The composition can be used as a replacement or a coating for concrete in structures designed to repair, replace, and/or enhance habitats for aquatic organisms. Various trace elements can be added to the composition to enhance the growth of targeted aquatic organisms. When cast in a molded process, the composition can be used for the fabrication of artificial reef modules as described in the prior art as well as the formation of aesthetically pleasing formations, such as replicated hard coral species (Agrapora) that are suitable for use in both saltwater and fresh water environments.

The initial step for using the present invention is to prepare a mold of the desired shape of the finished structure. The mold can be prepared by methods well known to those in the art such as those described in the Polytek® Moldmaking & Casting Methods & Materials Manual & Catalog. Although the example below describes the use of the composition with a poured mold, the composition can be used with other mold preparation and casting methods such as those described in the prior art for specific artificial reef structures such as Barber's reef ball.

As used herein, all percentages (%) are percent weight also expressed as weight/volume %, % (w/v), w/v, w/v % or simply %, unless otherwise indicated. The following example is a preferred embodiment of the composition according to the present invention. It should be noted, however, that this example is by no means a limitation of the invention, and that various modifications and improvements in the manufacturing process all fall under the scope of this invention.

EXAMPLE 1

| | |
|---|---|
| CaCo3 | from about 65 to about 85%; |
| Resin | from about 15 to about 35%; |

Preferably, calcium carbonate as aragonite is utilized. Aragonite (orthorhombic calcium carbonate) is the actual mineral secreted by the coral animals that make the reef/skeleton structures. Those skilled in the art will recognize that materials that are mostly calcium carbonate, such as limestone, can be used without departing from this invention. Other modifiers may be added in quantities from about 1-5%. These other modifiers may include trace minerals, including but not limited to such as Ca, K, Mg, and Sr, that promote algae and coral growth. The specific trace minerals added can be location specific, chosen to increase the availability of a substance that would otherwise limit the growth rate of the desired aquatic life-forms. Additionally, organic pigments can be added to match natural coral colors. If any modifiers are used, they are mixed using a manual or electric mixing appliance to achieve an approximately homogenous distribution within the calcium carbonate. The calcium carbonate with any modifiers is combined with a resin (preferably a marine use resin or Dion ISO® 6631) using a manual or electric mixing appliance. After the calcium carbonate and resin are thoroughly mixed, an appropriate initiator for hardening of formula such as methyl ethyl ketone peroxide is added at levels not less than 1.0 parts per hundred. Initiators compatible with particular resins are well known to those skilled in the art. At this point, the composition will begin to cure. Therefore, it is important to immediately pour the composition into the previously prepared mold. Curing or hardening of the formula depends on dimensions of the mold and molding technique being used for the particular component being replicated. Average gel time for a poured mold is approximately 20 to 30 minutes. The curing process will take a longer period to complete.

As described above, the preferred embodiment uses the composition of the present invention with a poured mold technique to replicate specific hard coral species. Another embodiment is to use the composition of the present invention as a coating for concrete in larger structures. This can be achieved by using a molding process to fabricate a shell made of the composition of the present invention in the desired shape. The shell/component can then be filled with concrete or another substance for weighting. A similar result can be achieved by fabricating the desired shape using concrete and coating it with the composition of the present invention after the concrete sets. Both the poured method, the shell method and the coating method are well known to those skilled in the moldmaking and casting art. Other methods of use include solid pour casting, slush casting, rotational casting, and direct lay-up with no mold.

I claim:

1. A method for fabricating structures that replicate coral reef material to promote algae and coral growth for use in aquatic environments comprising:
    preparing a mixture comprising;
    $CaCO_3$ (from about 65 to about 85%) and a resin (from about 15 to about 35%) where the resin is compatible with aquatic life-forms;
    adding an appropriate initiator to said mixture to start hardening of said mixture;
    mixing the resulting composition to achieve a close-to-homogenous distribution of the initiator in said mixture; and
    using the resulting composition in a molding process to fabricate the structure for said promoting said algae and coral growth for use in aquatic environments.

2. The method of claim 1, further comprising:
    amending said mixture with modifiers prior to adding said initiator.

3. The method of claim 2, with said modifiers comprising:
    about 1% to about 5% of trace minerals, including but not limited to Ca, K, Mg, and Sr, that promote algae and coral growth.

4. The method of claim 2, with said modifiers comprising:
    an organic pigment to color the composition.

5. The method of claim 4, with said modifiers further comprising:
    about 1% to about 5% of trace minerals, including but not limited to Ca, K, Mg, and Sr, that promote algae and coral growth.

6. The method of claim 1, wherein:
    aragonite is the form of $CaCO_3$ (calcium carbonate) utilized.

7. The method of claim 6, further comprising:
    amending said mixture with modifiers prior to adding said initiator.

8. The method of claim 7, with said modifiers comprising:
    about 1% to about 5% of trace minerals, including but not limited to Ca, K, Mg, and Sr, that promote algae and coral growth.

9. The method of claim 7, with said modifiers comprising:
    an organic pigment to color the composition.

10. The method of claim 9, with said modifiers further comprising:
    about 1% to about 5% of trace minerals, including but not limited to Ca, K, Mg, and Sr, that promote said algae and coral growth.

11. The method of claim 1, wherein:
    the resin used is either a marine use resin or Dion ISO® 6631.

12. The method of claim 11, further comprising:
    amending said mixture with modifiers prior to adding said initiator.

13. The method of claim 12, with said modifiers comprising:
    about 1% to about 5% of trace minerals, including but not limited to Ca, K, Mg, and Sr, that promote algae and coral growth.

14. The method of claim 12, with said modifiers comprising:
    an organic pigment to color the composition.

15. The method of claim 14, with said modifiers further comprising:
about 1% to about 5% of trace minerals, including but not limited to Ca, K, Mg, and Sr, that promote algae and coral growth.

16. A structure that replicates coral reef material to promote algae and coral growth for use in aquatic environments comprising:
$CaCO_3$; from about 65 to about 85%;
a resin from about 15 to about 35% where the resin is compatible with aquatic life-forms and setting of the resin was started through the use of an appropriate initiator and combined with the $CaCO_3$; and
wherein the above combination of resin and $CaCO_3$ is shaped to form said structure for said promoting said algae and coral growth for said use in aquatic environments.

17. The structure of claim 16, further comprising:
about 1% to about 5% of trace minerals, including but not limited to Ca, K, Mg, and Sr, that promote algae and coral growth.

18. The structure of claim 16, further comprising:
an organic pigment to color the composition.

19. The structure of claim 18, further comprising:
about 1% to about 5% of trace minerals, including but not limited to Ca, K, Mg, and Sr, that promote algae and coral growth.

20. The structure of claim 16, wherein:
aragonite is the form of calcium carbonate utilized.

21. The structure of claim 20, further comprising:
about 1% to about 5% of a modifier selected from the group consisting of Ca, K, Mg, and Sr, or a combination thereof.

22. The structure of claim 20, further comprising:
an organic pigment to color the composition.

23. The structure of claim 22, further comprising:
about 1% to about 5% of trace minerals, including but not limited to Ca, K, Mg, and Sr, that promote said algae and coral growth.

24. The structure of claim 16, wherein:
the resin used is either a marine use resin or Dion ISO® 6631.

25. The structure of claim 24, further comprising:
about 1% to about 5% of a modifier selected from the group consisting of Ca, K, Mg, and Sr, or a combination thereof.

26. The structure of claim 24, further comprising:
an organic pigment to color the composition.

27. The structure of claim 26, further comprising:
about 1% to about 5% of trace minerals, including but not limited to Ca, K, Mg, and Sr, that promote said algae and coral growth.

28. A product that promotes algae and coral growth, for use in aquatic environments, fabricated using the method described in claim 1.

29. A product that promotes algae and coral growth, for use in aquatic environments, fabricated using the method described in claim 1 whereby forming a shell that is subsequently filled with concrete or another product that would weight the product for permanent placement.

30. A product that promotes algae and coral growth as claimed in claim 28, wherein the composition fabricated during the method described in claim 1 is further used to form a shell which is then filled with concrete.

\* \* \* \* \*